US012107323B2

(12) United States Patent
Park et al.

(10) Patent No.: US 12,107,323 B2
(45) Date of Patent: Oct. 1, 2024

(54) ANTENNA DEVICE

(71) Applicant: DONGWOO FINE-CHEM CO., LTD., Jeollabuk-do (KR)

(72) Inventors: Jin Young Park, Seoul (KR); Young Su Lee, Gyeonggi-do (KR); Yoon Ho Huh, Seoul (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 215 days.

(21) Appl. No.: 17/850,004

(22) Filed: Jun. 27, 2022

(65) Prior Publication Data

US 2022/0328955 A1 Oct. 13, 2022

Related U.S. Application Data

(63) Continuation of application No. PCT/KR2020/019156, filed on Dec. 24, 2020.

(30) Foreign Application Priority Data

Dec. 27, 2019 (KR) ........................ 10-2019-0176080

(51) Int. Cl.

| | |
|---|---|
| ***H01Q 1/44*** | (2006.01) |
| ***H01Q 1/24*** | (2006.01) |
| ***H01Q 1/36*** | (2006.01) |
| ***H01Q 1/48*** | (2006.01) |

(52) U.S. Cl.

CPC ............... *H01Q 1/246* (2013.01); *H01Q 1/36* (2013.01); *H01Q 1/48* (2013.01)

(58) Field of Classification Search

CPC ............ H01Q 1/246; H01Q 1/36; H01Q 1/48; H01Q 1/364; H01Q 1/38; H01Q 1/405; H01Q 1/44; H01Q 9/045; H01Q 9/0485; H01Q 9/0414

See application file for complete search history.

(56) References Cited

U.S. PATENT DOCUMENTS

2022/0255215 A1* 8/2022 Park ......................... H01Q 1/38

FOREIGN PATENT DOCUMENTS

| | | | | |
|---|---|---|---|---|
| EP | 2526589 | A1 * | 11/2012 | ........... H01Q 1/1278 |
| KR | 10-2003-0018333 | A | 3/2003 | |
| KR | 2018-0097212 | A | 8/2018 | |
| KR | 10-1940797 | B1 | 1/2019 | |
| KR | 10-1962820 | B1 | 3/2019 | |
| KR | 10-1967771 | B1 | 4/2019 | |
| KR | 10-2019-0075430 | A | 7/2019 | |
| WO | WO 2011/089219 | A1 | 7/2011 | |

OTHER PUBLICATIONS

International Search Report for PCT/KR2020/019156 mailed on Apr. 6, 2021.

* cited by examiner

*Primary Examiner* — David E Lotter

(74) *Attorney, Agent, or Firm* — The PL Law Group, PLLC

(57) ABSTRACT

An antenna device according to an embodiment of the present invention includes a dielectric layer, an antenna unit disposed on a top surface of the dielectric layer, and a ground layer disposed on a bottom surface of the dielectric layer. The ground layer has a first mesh structure that includes first cut portions therein. A radiation coverage is expanded by the ground layer.

12 Claims, 5 Drawing Sheets

ANTENNA DEVICE

CROSS-REFERENCE TO RELATED APPLICATION AND CLAIM OF PRIORITY

The present application is a continuation application to International Application No. PCT/KR2020/019156 with an International Filing Date of Dec. 24, 2020, which claims the benefit of Korean Patent Application No. 10-2019-0176080 filed on Dec. 27, 2019 at the Korean Intellectual Property Office, the disclosures of which are incorporated by reference herein in their entirety.

BACKGROUND

1. Field

The present invention relates to an antenna device. More particularly, the present invention relates to an antenna device including an electrode layer and a dielectric layer.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

A radio wave in a ultrahigh frequency band may be relatively blocked by an obstacle or has a short transfer distance. Thus, a signal loss may easily occur. Accordingly, relay antennas may be installed in a base station and a repeater for ultra-high frequency communication.

Even though the relay antennas are installed, a sufficient gain due may not be obtained due to a narrow radiation coverage in a high-frequency or ultra-high frequency band (e.g., 3G, 4G, 5G or higher).

Additionally, the relay antenna may be installed in various structures such as buildings and vehicles. When the relay antenna is attached to a transparent structure such as a glass window, aesthetic properties may be degraded.

Thus, an antenna structure having increased transparency that may not degrade an appearance of an object and having improving radiation properties is needed.

SUMMARY

According to an aspect of the present invention, there is provided an antenna device having improved radiation and optical properties.

(1) An antenna device, including: a dielectric layer; an antenna unit disposed on a top surface of the dielectric layer; and a ground layer disposed on a bottom surface of the dielectric layer, the ground layer having a first mesh structure that includes first cut portions therein.

(2) The antenna device of the above (1), wherein the first mesh structure includes first conductive lines intersecting each other to define unit cells, and each of the unit cells includes at least one of the first cut portions.

(3) The antenna device of the above (2), wherein the at least one of the first cut portions is formed on at least one side of each of the unit cells.

(4) The antenna device of the above (2), wherein the at least one of the first cut portions is formed at an intersection area where the first conductive lines meet each other.

(5) The antenna device of the above (1), wherein the antenna unit includes a radiator, a transmission line extending from the radiator, and a signal pad connected to one end portion of the transmission line.

(6) The antenna device of the above (5), wherein the radiator has a second mesh structure.

(7) The antenna device of the above (6), further including a dummy pattern around the radiator on the top surface of the dielectric layer to be spaced apart from the radiator.

(8) The antenna device of the above (7), wherein the dummy pattern has a third mesh structure.

(9) The antenna device of the above (8), wherein the third mesh structure includes second conductive lines intersecting each other, and second cut portions formed by partially cutting the second conductive lines.

(10) The antenna device of the above (6), wherein the signal pad has a solid structure.

(11) The antenna device of the above (5), wherein the ground layer overlaps the radiator in a plan view.

(12) The antenna device of the above (11), wherein a plurality of the antenna units are arranged on the dielectric layer, and the ground layer continuously and commonly overlaps the plurality of the antenna units.

(13) The antenna device of the above (1), wherein an upward vertical radiation from the top surface of the dielectric layer is implemented by the radiator, and a downward vertical radiation from the bottom surface of the dielectric layer is implemented by the ground layer.

(14) The antenna device of the above (1), wherein the antenna device is used as a relay antenna or a base station antenna.

An antenna device according to embodiments of the present invention may include a radiator and a ground layer facing each other with a dielectric layer interposed therebetween. The radiator may provide a directivity of a substantially perpendicular radiation over the dielectric layer.

In exemplary embodiments, the ground layer may have a mesh structure. Accordingly, transparency of the antenna device may be improved. The mesh structure of the ground layer may include a plurality of cut portions. Accordingly, a lower surface radiation under the dielectric layer may be provided while reducing a radio wave reflection by the ground layer.

Thus, an antenna device having substantially double-sided radiation properties may be implemented. The antenna device may be fabricated in the form of a transparent patch to be easily attached without degrading aesthetics of a transparent structure such as a window or a glass in a building or a vehicle.

DETAILED DESCRIPTION OF THE EMBODIMENTS

According to exemplary embodiments of the present invention, there is provided an antenna device that includes a radiator and a ground layer having a mesh structure to have increased radiation coverage.

The antenna device may be, e.g., a microstrip patch antenna fabricated in the form of a transparent film. The antenna device may be applied to communication devices for a mobile communication of a high or ultrahigh frequency band (e.g., 3G, 4G, 5G or more).

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first", "second", "third", etc., herein are used to relatively distinguish different components, and are not intended to absolutely limit an order, a position, etc.

Figure 1:
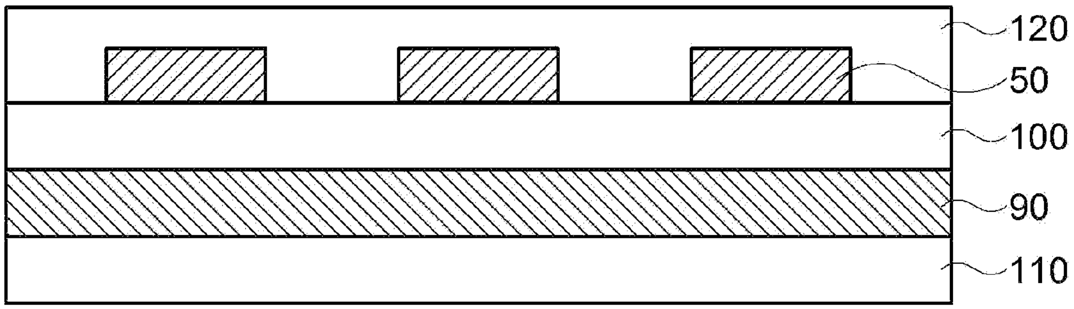
FIG. 1 is a schematic cross-sectional view illustrating an antenna device in accordance with exemplary embodiments.

FIG. 1 is a schematic cross-sectional view illustrating an antenna device in accordance with exemplary embodiments.

Referring to FIG. 1, the antenna device may include a dielectric layer 100, an antenna unit 50 and a ground layer 90.

The dielectric layer 100 may include an insulating material having a predetermined dielectric constant. The dielectric layer 100 may serve as a film substrate of the antenna device on which the antenna unit 50 is formed.

For example, the dielectric layer 100 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth) acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In some embodiments, an adhesive film such as an optically clear adhesive (OCA), an optically clear resin (OCR), or the like may be included in the dielectric layer 100.

In some embodiments, the dielectric layer 100 may include an inorganic insulating material such as glass, silicon oxide, silicon nitride, silicon oxynitride, glass, or the like.

In some embodiments, a dielectric constant of the dielectric layer 100 may be adjusted in a range from about 1.5 to about 12. When the dielectric constant exceeds about 12, a driving frequency may be excessively decreased and a driving in a desired high-frequency or ultrahigh frequency band may not be implemented. Preferably, the dielectric constant of the dielectric layer 100 may be adjusted in a range from about 2 to about 10.

In some embodiments, the dielectric layer 100 may have a multi-layered structure. For example, the dielectric layer 100 may include an antenna base layer and a lower dielectric layer. The antenna base layer may serve as a substrate layer for forming and patterning the antenna unit 50. The lower dielectric layer may be in contact with the ground layer 90.

For example, the lower dielectric layer may include an adhesive film such as an optically clear adhesive (OCA), an optically clear resin (OCR), or the like.

An antenna conductive layer including the antenna unit 50 may be formed on a top surface of the dielectric layer 100. Elements and structure of the antenna unit 50 will be described later in more detail with reference to FIG. 2.

The ground layer 90 may be disposed on a bottom surface of the dielectric layer 100. In exemplary embodiments, the ground layer 90 may include a mesh structure (a first mesh structure). A structure of the ground layer 90 will be described later in more detail with reference to FIG. 3.

The antenna unit 50 (or the antenna conductive layer) and the ground layer 90 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy containing at least one of the metals. These may be used alone or in a combination of at least two therefrom.

For example, the antenna unit 50 and the ground layer 90 may include silver (Ag) or a silver alloy to implement a low resistance, and may include, e.g., a silver-palladium-copper (APC) alloy. In some embodiments, the antenna unit 50 and the ground layer 90 may include copper or a copper alloy (e.g., a copper-calcium (CuCa) alloy to implement a low resistance and a fine line-width patterning.

In some embodiments, the antenna unit 50 (or the antenna conductive layer) and the ground layer 90 may include a transparent conductive oxide such as indium tin oxide (ITO), indium zinc oxide (IZO), indium zinc tin oxide (ITZO), zinc oxide ($ZnO_x$), tin oxide ($SnO_x$), copper oxide ($CuO_x$), or the like.

In some embodiments, the antenna unit 50 (or the antenna conductive layer) and the ground layer 90 may have a multi-layered structure including at least one metal or alloy layer and a transparent conductive oxide layer. For example, the antenna unit 50 (or the antenna conductive layer) and the ground layer 90 may have a double-layered structure of a transparent conductive oxide layer-a metal layer, or a triple-layered structure of a transparent conductive oxide layer-a metal layer-a transparent conductive oxide layer. In this case, flexible property may be improved by the metal layer while reducing a resistance. Corrosive resistance and transparency may be improved by the transparent conductive oxide layer.

In some embodiments, the antenna unit 50 may include a blackened portion, so that a reflectance at a surface of the antenna unit 50 may be decreased to suppress a visual pattern recognition due to a light reflectance.

In an embodiment, a surface of the metal layer included in the antenna unit 50 may be converted into a metal oxide or a metal sulfide to form a blackened layer. In an embodiment, a blackened layer such as a black material coating layer or a plating layer may be formed on the antenna unit or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

A protective layer 120 may be formed on the dielectric layer 100 to cover the antenna units 50. The protective layer 120 may include an inorganic material such as silicon oxide, silicon nitride, silicon oxynitride, etc., an organic material such as an acrylic resin, an epoxy resin, etc., or an organic-inorganic hybrid insulating material.

In some embodiments, a ground base layer 110 may be disposed under the ground layer 90. The ground layer 90 may be formed on the ground base layer 110, and then may be combined with the dielectric layer 100. The ground base layer 110 may serve as a lower protective layer protecting the ground layer 90.

Figure 2:
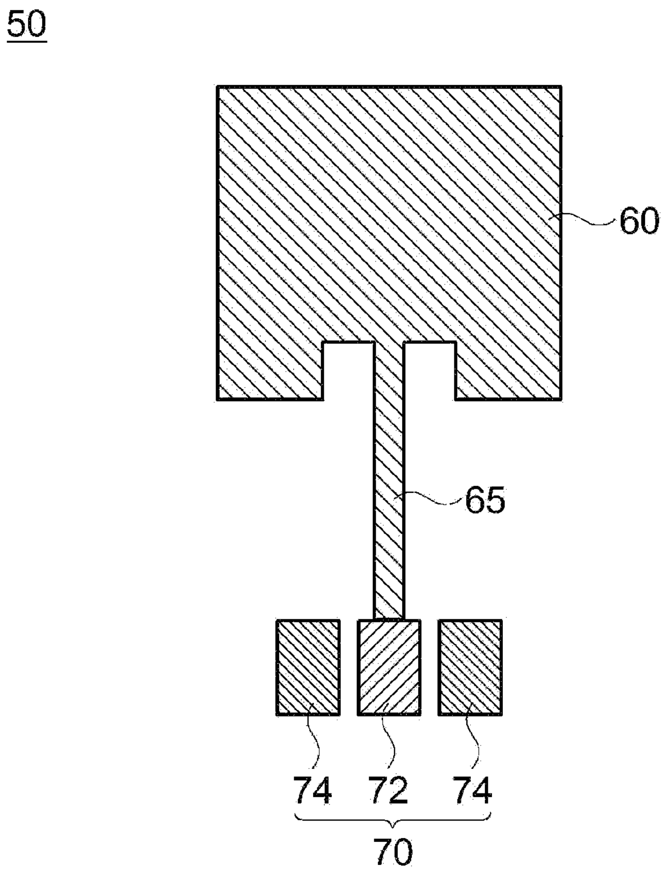
FIG. 2 is a schematic plan view illustrating a structure of an antenna unit included in an antenna device in accordance with exemplary embodiments.

FIG. 2 is a schematic plan view illustrating a structure of an antenna unit included in an antenna device in accordance with exemplary embodiments.

Referring to FIG. 2, the antenna unit 50 may include a radiator 60, a transmission line 65 and a pad 70.

In some embodiments, the pad 70 may include a signal pad 72, and may further include a ground pad 74. For example, a pair of ground pads 74 may be disposed with the signal pad 72 interposed therebetween. The ground pads 74 may be electrically isolated from the signal pad 72 and the transmission line 65.

The radiator 60 may have, e.g., a polygonal plate shape, and the transmission line 65 may extend from a central portion of the radiator 60 to be electrically connected to the signal pad 72. The transmission line 65 may be formed as a single member substantially integral with the radiator 60.

In an embodiment, the radiator 60 may have a mesh structure (a second mesh structure) including the aforementioned metal or alloy to improve a transmittance of the antenna unit 50.

The transmission line 65 may also include the mesh structure. In an embodiment, the pad 70 may have a solid structure to improve a signal transmission speed and reduce a resistance.

In an embodiment, the radiator 60 may have a solid structure in the form of a thin transparent metal layer. In this case, a resistance may be further reduced, so that feeding and power efficiency may be further improved.

As described above, the antenna unit 50 may be disposed to face the ground layer 90 with the dielectric layer 100 interposed therebetween. In exemplary embodiments, the ground layer 90 may substantially completely cover the radiator 60 of the antenna unit 50 in a plan view.

In exemplary embodiments, as illustrated in FIG. 1, a plurality of the antenna units 50 may be repeatedly arranged on the top surface of the dielectric layer 100. In this case, the ground layer 90 may be a continuous pattern or a continuous layer commonly overlapping the plurality of the antenna units 50 (or the radiators 60) with the dielectric layer 100 interposed therebetween.

For example, capacitance or inductance may be formed between the radiator 60 and the ground layer 90 by the dielectric layer 100 in a thickness direction of the antenna device, so that a frequency band at which the antenna device is driven or sensed may be adjusted. For example, a vertical radiation from the top surface of the dielectric layer 100 in an upward direction (e.g., a direction toward a front surface of an image display device) may be substantially implemented through the radiator 60.

Figure 3:
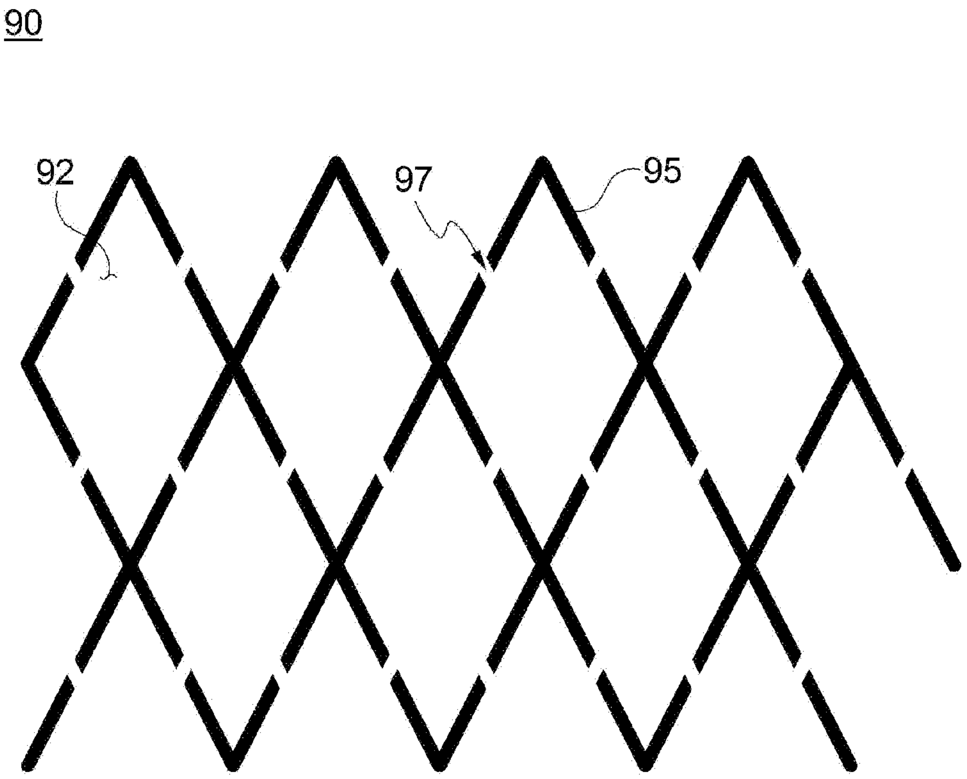
FIG. 3 is a schematic plan view illustrating a structure of a ground layer included in an antenna device in accordance with exemplary embodiments.

FIG. 3 is a schematic plan view illustrating a structure of a ground layer included in an antenna device in accordance with exemplary embodiments.

Referring to FIG. 3, the ground layer 90 may have the first mesh structure as described above. As illustrated in FIG. 3, a plurality of first conductive lines 95 may cross each other to form, e.g., a diamond-shaped unit cell 92. A plurality of the unit cells 92 may be assembled to define the first mesh structure.

A first cut portion 97 formed by cutting the first conductive line 95 may be included in the first mesh structure. In exemplary embodiments, at least one first curt portion 97 may be formed in each unit cell 92.

In some embodiments, the first cut portion 97 may be formed in all sides of each unit cell 92.

As described above, the ground layer 90 may have the mesh structure, so that a transmittance of the antenna device may be improved. Accordingly, even when the antenna device is attached to a transparent structure such as a glass window of a building or a vehicle, degradation of appearance and aesthetic properties due to a visual recognition of the antenna device may be prevented.

Further, the first cut portions 97 may be distributed in the ground layer 90, so that radio wave radiation or electric field reflection in the upward direction by the ground layer 90 may be reduced or suppressed. Thus, a vertical radiation in a downward direction (e.g., in a direction toward a rear surface of the image display device) from the bottom surface of the dielectric layer 100 by the ground layer 90 may be implemented together with the vertical radiation to the upward direction.

For example, the vertical radiation in the downward direction through the radiator 60 may be partially shifted in the downward direction.

In an embodiment, an aperture ratio of the first mesh structure or the ground layer 90 may be about 60% or more, preferably about 65% or more.

Figure 4:
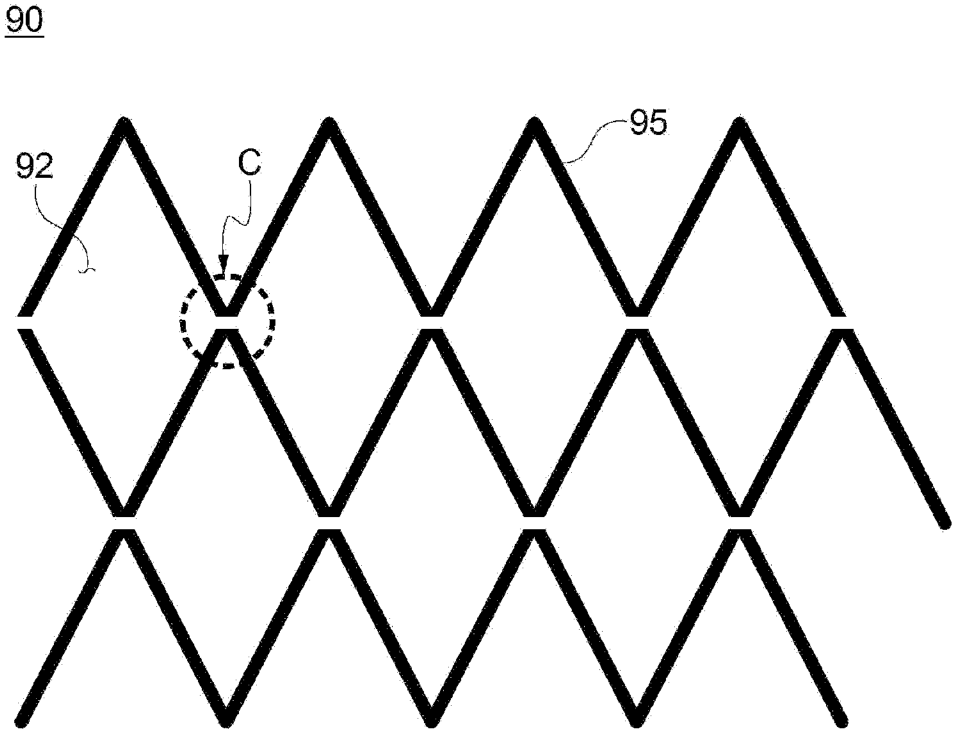
FIG. 4 is a schematic plan view illustrating a ground layer included in an antenna device in accordance with some exemplary embodiments.

FIG. 4 is a schematic plan view illustrating a ground layer included in an antenna device in accordance with some exemplary embodiments.

Referring to FIG. 4, in the first mesh structure included in the ground layer 90, the first cut portions 97 described with reference to FIG. 3 may be formed at vertices of the unit cell 92.

For example, the first segment portions may be formed in an intersection area C where the first conductive lines 95 meet each other. The first electrode lines 95 may be merged at the intersection area C, and thus a thickness or a volume of the mesh structure may be increased at the intersection area C. Accordingly, the reflectance may be relatively increased at the intersection area C to deteriorate the vertical radiation formation in the downward direction may be inhibited.

However, the first cut portions may be formed in the intersection area C, so that an amount of the conductive material at the intersection area C may be reduced. Thus, the reflectance of the ground layer 90 may be effectively reduced, and the vertical radiation in the downward direction may be easily induced.

Figure 5:
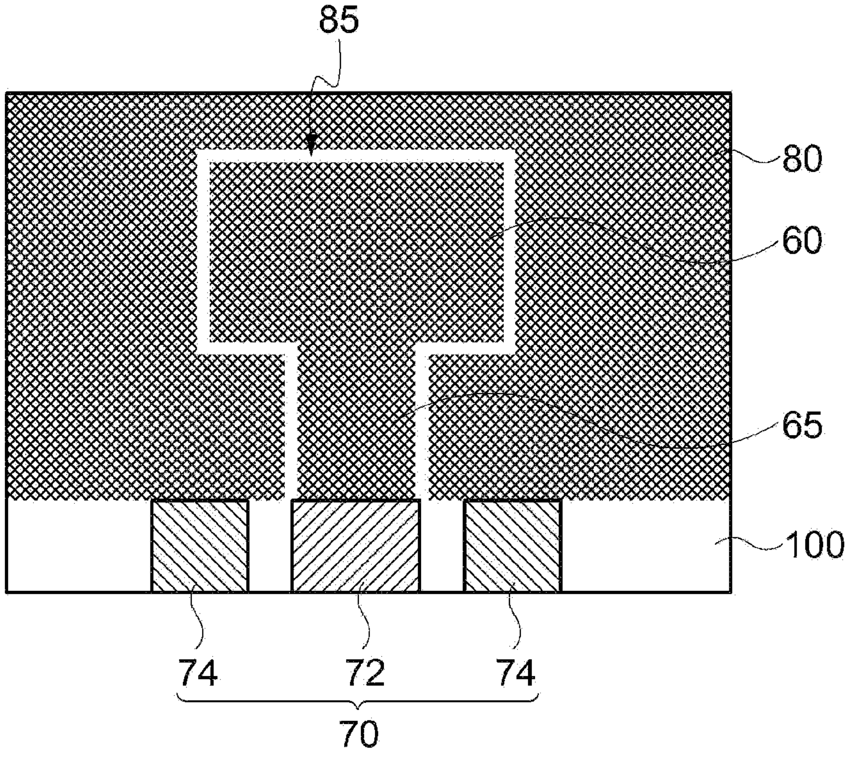
FIG. 5 is a plan view illustrating an antenna conductive layer included in an antenna device in accordance with exemplary embodiments.

FIG. 5 is a plan view illustrating an antenna conductive layer included in an antenna device in accordance with exemplary embodiments.

Referring to FIG. 5, the radiator 60 of the antenna unit may include a mesh structure (the second mesh structure). In this case, the transmittance of the antenna device may be further improved. For example, the radiator 60 may have a structure in which conductive lines including the metal or alloy intersect in a mesh shape.

The transmission line 65 may also include the mesh structure. In an embodiment, the pad 70 may have a solid structure to improve a signal transmission speed and reduce a resistance.

The antenna conductive layer may further include a dummy pattern 80 disposed around the radiator 60 and the transmission line 65. The dummy pattern 80 may also include a mesh structure (a third mesh structure). The third mesh structure may have substantially the same shape (e.g., the same line width, the same unit cell shape, etc.) as that of the second mesh structure. In some embodiments, the third mesh structure may include the same metal as that of the second mesh structure.

For example, a conductive layer may be formed on the dielectric layer 100, and the conductive layer may be etched along profiles of the radiator 60 and the transmission line 65 to form a separation region 85 while etching the conductive layer to form the mesh structure. Accordingly, the dummy pattern 80 spaced apart from the radiator 60 and the transmission line 65 by the separation region 85 may be defined.

An conductive line arrangement around the radiator 60 including the second mesh structure may become uniform by the dummy pattern 80 to suppress or reduce a visual recognition of the antenna unit to a user.

The dummy pattern 80 may not be formed around the pad 70 having the solid metal pattern structure.

Figure 6:
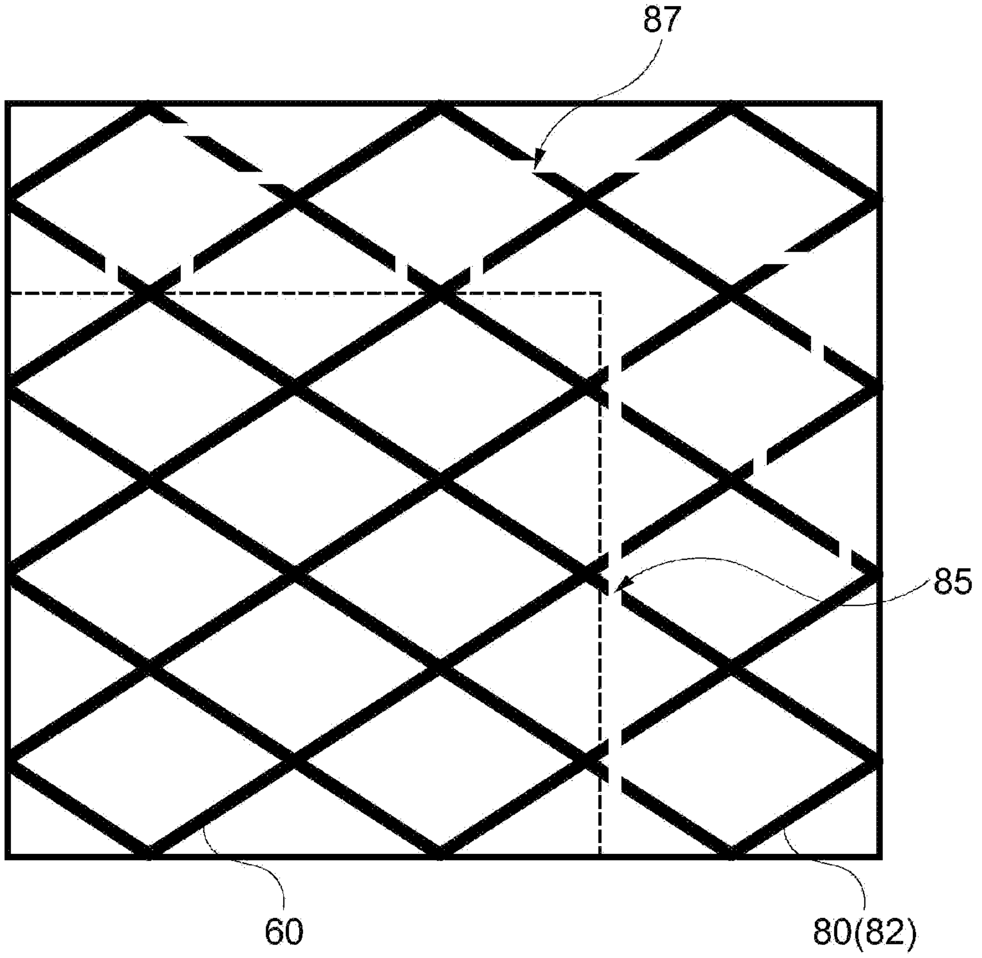
FIG. 6 is a partially enlarged plan view illustrating an antenna conductive layer included in an antenna device in accordance with some exemplary embodiments.

FIG. 6 is a partially enlarged plan view illustrating an antenna conductive layer included in an antenna device in accordance with some exemplary embodiments. For example, FIG. 6 is an enlarged view of mesh structures of the radiator 60 and the dummy pattern 80 around the separation region 85.

Referring to FIG. 6, as described above, the separation region 85 may be formed by cutting the conductive layer as indicated by a dotted line, so that a boundary or a perimeter of the radiator 60 may be formed.

Second cut portions 87 formed by cutting second electrode lines 82 included in the mesh structure may be distributed in the dummy pattern 80. For example, the second cut portions 87 may be randomly or irregularly distributed in the dummy pattern 80, so that an electrode visual recognition or a moiré phenomenon caused by a regular repetition of a pattern shape mat be reduced or prevented.

Further, the second cut portions 87 may be formed in the dummy pattern 80, so that radiation interference and noise between the adjacent radiators 60 may be shielded.

The antenna device according to the above-described exemplary embodiments may be employed as, e.g., an antenna for a base station or a relay antenna. As a frequency band of a communication terminal such as a mobile display device increases, a signal loss in an air and a radio wave block by obstacles may easily occur.

Thus, in the case of high-frequency or ultrahigh-frequency communications, a plurality of base stations and/or repeaters may be located, and the above-described antenna device may be employed to provide a bi-directional radiation without degrading transparency of an object. Accordingly, A beam coverage in the base station and/or the repeater may be extended, and signaling properties in the communication terminal may be improved.

Hereinafter, preferred experimental examples are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Experimental Example

An antenna layer of a mesh structure was formed on a top surface of a glass dielectric layer (0.5T) using an alloy (APC) of silver (Ag), palladium (Pd) and copper (Cu), and a ground layer was formed on a bottom surface of the dielectric layer using the APC alloy. Conductive lines in the mesh structure were formed to have a line width of 3 μm and a thickness (or a height) of 2,500 Å, and diagonal lengths of a rhombus unit cell included in the antenna conductive layer and the ground layer in an X-axis direction and a Y-axis direction was 125 μm and 250 μm, respectively.

A power was supplied to the antenna conductive layer while changing the number of cut portions per unit cell included in the ground layer to measure gains (dB) of a front radiation and a rear radiation.

The measurement results are shown in Table 1 below.

TABLE 1

| Number of cut portions per unit cell in ground layer | Front radiation gain (dB) | Rear radiation gain (dB) | total gain(dB) |
|---|---|---|---|
| 0 | 4.8 | — | 4.8 |
| 1 | 3.5 | 1.0 | 4.5 |
| 2 | 2.8 | 1.8 | 4.6 |
| 3 | 2.0 | 2.4 | 4.4 |
| 4 | 1.5 | 3.0 | 4.5 |

Referring to Table 1, as the number of the cut portions per unit cell of the ground layer increased, the rear radiation was increased and a double-sided radiation property was substantially implemented.

What is claimed is:

1. An antenna device, comprising:

a dielectric layer;

an antenna unit disposed on a top surface of the dielectric layer, the antenna unit comprising a radiator that has a second mesh structure;

a ground layer disposed on a bottom surface of the dielectric layer, the ground layer having a first mesh structure that includes first cut portions therein; and a dummy pattern around the radiator on the top surface of the dielectric layer to be spaced apart from the radiator.

2. The antenna device of claim 1, wherein the first mesh structure comprises first conductive lines intersecting each other to define unit cells, and each of the unit cells comprises at least one of the first cut portions.

3. The antenna device of claim 2, wherein the at least one of the first cut portions is formed on at least one side of each of the unit cells.

4. The antenna device of claim 2, wherein the at least one of the first cut portions is formed at an intersection area where the first conductive lines meet each other.

5. The antenna device of claim 1, wherein the antenna unit further comprises a transmission line extending from the radiator, and a signal pad connected to one end portion of the transmission line.

6. The antenna device of claim 1, wherein the dummy pattern has a third mesh structure.

7. The antenna device of claim 6, wherein the third mesh structure comprises second conductive lines intersecting each other, and second cut portions formed by partially cutting the second conductive lines.

8. The antenna device of claim 1, wherein the signal pad has a solid structure.

9. The antenna device of claim 1, wherein the ground layer overlaps the radiator in a plan view.

10. The antenna device of claim 9, wherein a plurality of the antenna units are arranged on the dielectric layer, and the ground layer continuously and commonly overlaps the plurality of the antenna units.

11. The antenna device of claim 1, wherein an upward vertical radiation from the top surface of the dielectric layer is implemented by the radiator, and a downward vertical radiation from the bottom surface of the dielectric layer is implemented by the ground layer.

12. The antenna device of claim 1, wherein the antenna device is used as a relay antenna or a base station antenna.

* * * * *